(12) United States Patent
Lee

(10) Patent No.: US 7,663,824 B2
(45) Date of Patent: Feb. 16, 2010

(54) VOICE COIL MODULE

(75) Inventor: Byoung Su Lee, Yeosu-si (KR)

(73) Assignee: Siliconfile Technologies Inc., Seoul (KR)

( * ) Notice: Subject to any disclaimer, the term of this patent is extended or adjusted under 35 U.S.C. 154(b) by 0 days.

(21) Appl. No.: 12/159,294

(22) PCT Filed: Jan. 9, 2007

(86) PCT No.: PCT/KR2007/000136

§ 371 (c)(1),
(2), (4) Date: Jun. 26, 2008

(87) PCT Pub. No.: WO2007/086659

PCT Pub. Date: Aug. 2, 2007

(65) Prior Publication Data

US 2008/0304154 A1    Dec. 11, 2008

(30) Foreign Application Priority Data

Jan. 24, 2006    (KR) .................... 10-2006-0007210

(51) Int. Cl.
*G02B 7/02* (2006.01)
(52) U.S. Cl. .................. 359/824; 359/811; 359/819; 359/822; 359/823
(58) Field of Classification Search .............. 359/811, 359/819, 822–824
See application file for complete search history.

(56) References Cited

U.S. PATENT DOCUMENTS

| 5,289,318 A | * | 2/1994 | Sekine et al. ............... 359/813 |
| 5,610,885 A | * | 3/1997 | Takahashi ................ 369/44.28 |
| 5,900,995 A | * | 5/1999 | Akada et al. ................ 359/824 |

FOREIGN PATENT DOCUMENTS

| JP | 08-094904 | 4/1996 |
| JP | 08-115526 | 5/1996 |

OTHER PUBLICATIONS

International Search Report for corresponding to PCT/KR2007/000136 dated May 21, 2007.
Written Opinion of the International Searching Authority for corresponding to PCT/KR2007/000136 dated May 21, 2007.

* cited by examiner

*Primary Examiner*—Jessica T Stultz
*Assistant Examiner*—Mahidere S Sahle
(74) *Attorney, Agent, or Firm*—Jae Y. Park; Kile Goekjian Reed & McManus PLLC

(57) ABSTRACT

The present invention relates to a voice coil module (VCM), and more particularly, to a VCM used for lens fixation and displacement measurement in order to prevent and control power consumption. Accordingly, in the VCM, power is not additionally consumed in order to maintain a specific position of the lens in a state that a focus of the lens is adjusted. Further, the lens is not moved and an optical axis is not distorted when a vibration occurs while an image is captured. Furthermore, the lens can be accurately controlled by measuring the present position of the lens.

7 Claims, 3 Drawing Sheets

I : CURRENT
t : time

VOICE COIL MODULE

BACKGROUND OF THE INVENTION

1. Field of the Invention

The present invention relates to a voice coil module (VCM), and more particularly, to a VCM used for lens fixation and displacement measurement in order to prevent and control power consumption.

2. Description of the Related Art

A voice coil module (VCM) generally includes a permanent magnet and a coil. An attractive force or a repulsive force is produced between an induced magnetic field generated by a current flowing through the coil and a magnetic filed generated by the permanent magnet. Displacement of a lens occurs due to a spring force as well as the attractive force or the repulsive force.

The VCM advantageously has a simple structure and a low manufacturing cost. Therefore, the VCM is widely used in a driving unit of an automatic focusing device provided to a small image sensor. The driving unit of the automatic focusing device may be implemented with a stepping motor or an ultrasonic motor.

Manufacturing of a small stepping motor requires a high cost and a difficult technique. Therefore, a small automatic focusing device is generally driven by using the ultrasonic motor or the VCM.

FIG. 1 illustrates a structure of a conventional VCM.

A lens 110 is fixed to a vertically movable lens barrel 120. A coil 140 that generates a magnetic field in response to an input current is disposed to the lens barrel 120. The lens barrel 120 is connected with a casing 130 and a spring 150. A permanent magnet 160 is fixed to the casing 130. A current 180 is supplied to the coil 140 through an input terminal 170 while changing its direction and magnitude. In this case, the lens barrel 120 moves to an equilibrium point between a spring force and a magnetic force exerted between the permanent magnet 160 and the coil 140.

According to the magnitude and direction of the input current, a displacement 190 of the lens barrel 120 is regulated. In the VCM having this structure, a current having a constant magnitude and direction has to be continuously provided so that the lens 110 can maintain a constant position, resulting in a significant amount of power loss.

That is, although the VCM can be manufactured in a small size due to its cost competitiveness, simply operation, and simple structure, the conventional VCM has a demerit in that power loss is more significant than the ultrasonic motor since, in order to fix the lens 110 to a specific position, a constant current has to be continuously supplied to a driving coil. Such power loss is a major stumbling block when it comes to put the VCM to the market for a small-sized product using a battery.

Furthermore, the conventional VCM is not provided with a method for determining whether the VCM is correctly controlled and for measuring a present position of the VCM. Therefore, a problem lies in that it is difficult to accurately control the VCM, and an erroneous operation cannot be prevented.

SUMMARY OF THE INVENTION

In order to solve the aforementioned problems, an object of the present invention is to provide a voice coil module (VCM) in which power loss can be avoided in a state that a lens is fixed to a specific position, an unclear image can be avoided by preventing vibration of the lens when a minute vibration occurs while an image is captured or by preventing distortion of an optical axis, accurate control can be achieved by measuring a present displacement according to operations of the VCM, and an erroneous operation can be avoided.

According to an aspect of the present invention, there is provided a VCM comprising: a lens barrel to which the lens is attached and which is vertically movable along with the lens; a lens barrel fixing pin which is provided to left and right sides of the lens barrel so as to fix the lens barrel; a casing which includes the lens barrel in its center; a first spring which is attached to the casing at a lower end of the lens barrel; a second spring which is joined between the lens barrel fixing pin and an inner surface of the casing; and a lens barrel fixing pin driving coil which is attached to an outer surface of the casing and an extended line from the lens barrel fixing pin.

In the aforementioned aspect of the present invention, the VMC may further comprise: a first position measuring coil which is attached to the outer surface of the lens barrel; a second position measuring coil which is attached to the outer surface of the casing in a right-angle direction with respect to the lens barrel fixing pin driving coil; a current input terminal which supplies a current to either the first position measuring coil or the second position measuring coil; and a position measuring voltage output terminal which is connected to one of the first and second position measuring coils which is not connected to the current input terminal.

DETAILED DESCRIPTION OF THE INVENTION

Hereinafter, exemplary embodiments of the present invention will be described in detail with reference to the accompanying drawings.

Figure 2:
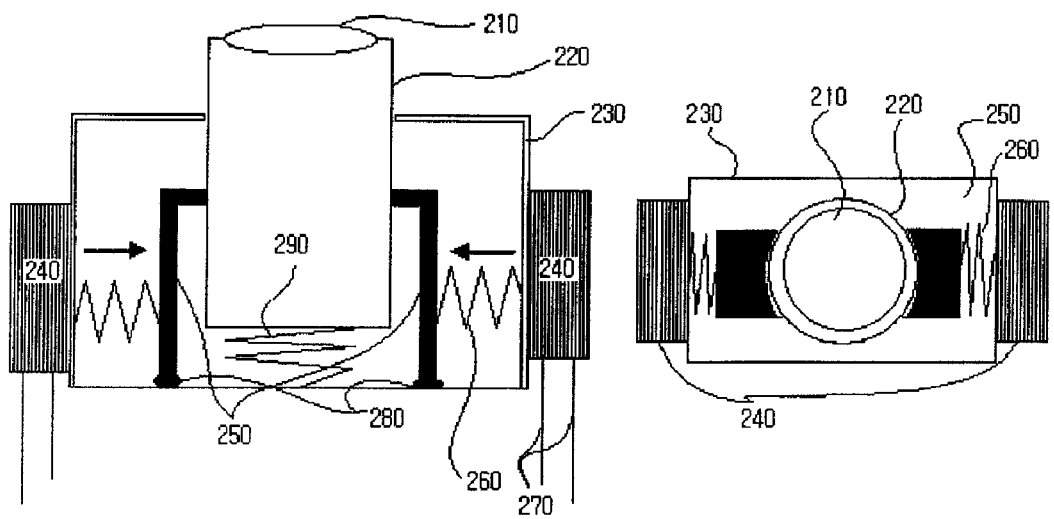
FIG. 2 illustrates a lens fixing unit of a VCM according to an embodiment of the present invention.

FIG. 2 illustrates a lens fixing unit of a VCM according to an embodiment of the present invention. The lens fixing unit includes a lens 210, an lens barrel 220, a casing 230, an lens barrel fixing pin 250, a coil 240 for driving the lens barrel fixing pin 250, a first spring 290 for supporting the lens barrel 220, and a second spring 260.

The lens barrel 220, which is vertically movable along with the lens 210, is held by the lens barrel fixing pin 250 by a strength of the second spring 260 fixed to the casing 230. The lens barrel fixing pin 250 is a ferromagnetic body or a paramagnetic body. A direct connection 280 is made between the lens barrel fixing pin 250 and the casing 230. Further, the lens barrel fixing pin 250 is connected with the casing 230 and the second spring 260 so that the lens barrel fixing pin 250 can move only in a horizontal direction. Accordingly, the lens barrel 220 and the lens 210 are fixed by the lens barrel fixing pin 250 and the second spring 260 without power loss.

If there is a need for moving the lens 210, the coil 240 fixed to the casing 230 and a current input terminal 270 through which a current is supplied to the coil 240 are used. A moving operation of the lens 210 will now be described.

Figure 1:
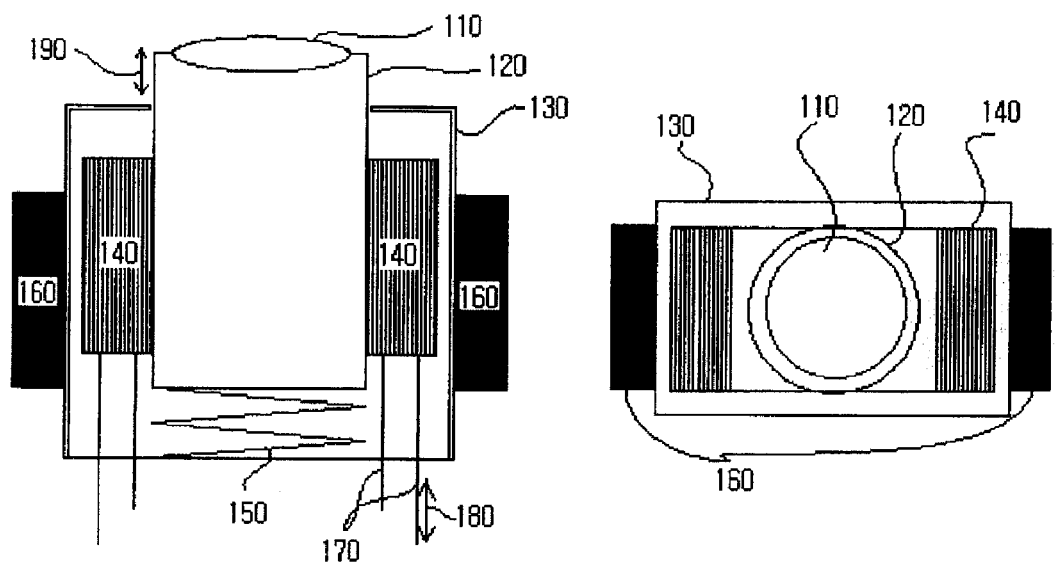
FIG. 1 illustrates a structure of a conventional voice coil module (VCM).

A magnetic field is generated when a current is supplied to the coil 240 fixed to the casing 230 through the current input terminal 270. The magnetic field allows the lens barrel fixing pin 250 to be moved towards the coil 240. Then, the lens barrel 220 is in a free state. As shown in FIG. 1, the lens barrel 220 vertically moves due to the attractive force or the repulsive force exerted between a magnetic field generated by the current flowing through the lens barrel driving coil 140 and a magnetic field generated by the permanent magnet 160, and the strength of the first spring 290 for supporting the lens barrel 220.

Figure 3:
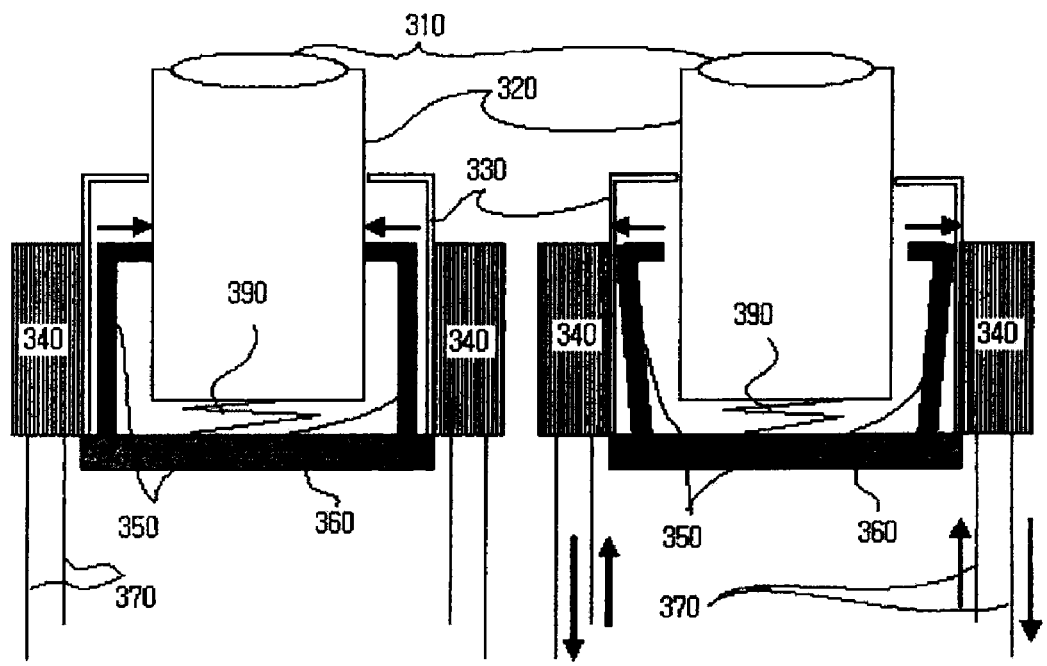
FIG. 3 illustrates a lens fixing unit of a VCM according to another embodiment of the present invention.

FIG. 3 illustrates a lens fixing unit of the VCM according to another embodiment of the present invention. The lens fixing unit includes an lens barrel 320, a casing 330, an lens barrel fixing pin 350 that is a ferromagnetic body or a paramagnetic body and has elasticity, and a supporter 360.

The lens barrel 320, which is vertically movable along with the lens 310, is held by the lens barrel fixing pin 350 fixed to the casing 330. The lens barrel fixing pin 350 is a ferromagnetic body or a paramagnetic body having elasticity. The lens barrel fixing pin 350 is fixed by the supporter 360.

Accordingly, the lens barrel 320 and the lens 310 are fixed by means of the lens barrel fixing pin 350 without power loss.

A moving operation of the lens 310 is the same as described above with reference to FIG. 2 except that the second spring 260 connected to the lens barrel fixing pin 250 is replaced with the lens barrel fixing pin 350 having elasticity.

Figure 4:
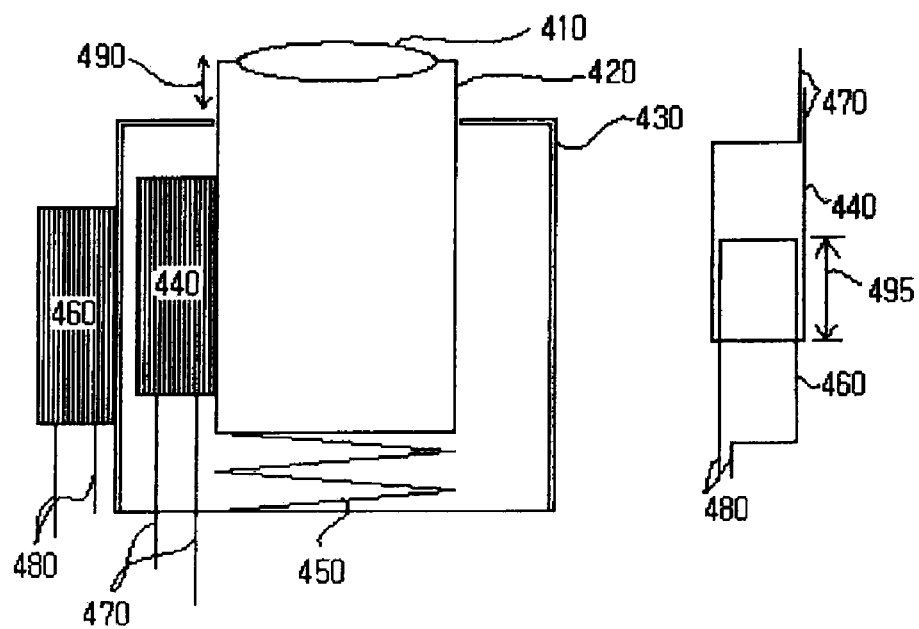
FIG. 4 illustrates a lens displacement measuring unit of a VCM according to another embodiment of the present invention.

FIG. 4 illustrates a lens displacement measuring unit of the VCM according to another embodiment of the present invention. The lens displacement measuring unit is provided in order to solve the problem of the VCM, in which, an erroneous operation may occur when a present position of a lens cannot be measured, and thus the VCM cannot determine whether accurate control is achieved or not.

A lens 410 is fixed to a vertically movable lens barrel 420. The lens barrel 420 is connected to a casing 430 by means of a spring 450. A coil 440 is fixed to the lens barrel 420 so as to move along with the lens barrel 420. A coil 460 is fixed to the casing 430. Each of the coils 440 and 460 includes a current input terminal 470 and a voltage output terminal 480.

In order to measure a displacement 490 of the lens barrel 420, an alternating current having a constant magnitude is supplied to the coil 440 fixed to the lens barrel 420. Then, a voltage induced to the coil 460 fixed to the casing 430 is measured.

When the displacement 490 of the lens barrel 420 is changed due to a current flowing through the driving coil 140 and the permanent magnet 160, changes occur in an area overlapping between the two coils 440 and 460 which face each other. In the case that each of the two coils 440 and 460 has a fixed width, the overlapping area is in proportion to a length 495 in which the two coils 440 and 460 overlap each other.

Therefore, the voltage induced to the coil 460 fixed to the casing 430 is in proportion to the length 495 in which the two coils 440 and 460 overlap each other. Accordingly, the length 495 in which the two coils 440 and 460 overlap each other can be measured by using a magnitude of the measured voltage, thereby determining whether accurate control can be achieved or not.

In this case, the locations of the two coils 440 and 460 can be switched each other. One of the two coils 440 and 460, which is connected to the current input terminal 470, may be the driving coil 140 of the VCM. That is, when an alternating current having a high frequency and a small amplitude is provided instead of a direct current for driving the driving coil 140 of the VCM, it is possible to induce a voltage in proportion to the aforementioned length 495.

Figure 5:
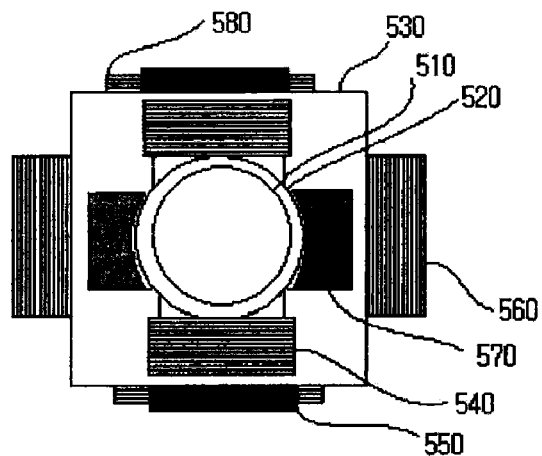
FIG. 5 illustrates a lens fixing unit and a lens displacement measuring unit of a VCM according to another embodiment of the present invention.

FIG. 5 illustrates a lens fixing unit and a lens displacement measuring unit of the VCM according to another embodiment of the present invention.

A lens 510 and a lens barrel driving coil 540 are fixed to a lens barrel 520. A coil 560, which drives a permanent magnet 550 and a lens barrel fixing pin 570, and a position measuring voltage output coil 580 are fixed to a casing 530. An end of the lens barrel fixing pin 570 is fixed to the casing 530.

While a current flows through the lens barrier fixing pin driving coil 560, the location of the lens barrel 520 is changed due to a direct current flowing through the lens barrel driving coil 540. A voltage is induced to the position measuring voltage output coil 580 due to a minute alternating current having a high frequency and flowing through the lens barrel driving coil 540. The present position of the lens barrel 520 can be measured according to a magnitude of the voltage which induced to the position measuring voltage output coil 580.

Figure 6:
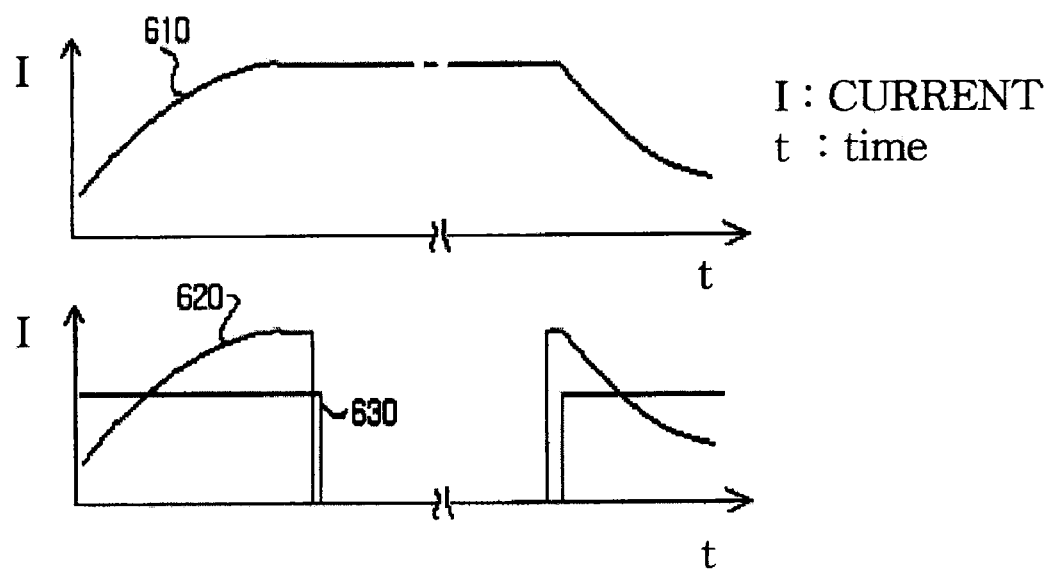
FIG. 6 is a graph for comparing a current in the present of a lens barrel fixing pin and a current in the absent of the lens barrel fixing pin.

FIG. 6 is a graph for comparing a current in the present of a lens barrel fixing pin and a current in the absent of the lens barrel fixing pin.

When the lens barrel fixing pin is absent, after a lens barrel reaches a predetermined point by a supply of a current indicated by a current curve 610, a constant current has to be continuously supplied to a driver stage in order to fix a position of the lens barrel. On the other hand, when the lens barrel fixing pin is present, the supply of a current indicated by a current curve 620 supplied to the driver stage can be stop almost at the same time as the supply of a current indicated by a current curve 630 to the lens barrel fixing pin, thereby reducing power loss.

Accordingly, in a voice coil module (VCM) of the present invention, power loss can be avoided in a state that a lens is fixed to a specific position, an unclear image can be avoided by preventing vibration of the lens when a minute vibration occurs while an image is captured or by preventing distortion of an optical axis, accurate control can be achieved by measuring a present position, and an erroneous operation can be avoided.

What is claimed is:

1. A voice coil module (VCM) that regulates a location of a lens by using an attractive force or a repulsive force exerted between a magnetic field generated by a permanent magnet and a magnetic field generated by a current flowing through a coil, comprising:
   a lens barrel to which the lens is attached and which is vertically movable along with the lens;
   a lens barrel fixing pin which is provided to left and right sides of the lens barrel so as to fix the lens barrel;
   a casing which includes the lens barrel in its center;
   a first spring which is attached to the casing at a lower end of the lens barrel;
   a second spring which is joined between the lens barrel fixing pin and an inner surface of the casing; and
   a lens barrel fixing pin driving coil which is attached to an outer surface of the casing and an extended line from the lens barrel fixing pin.

2. The VCM of claim 1, further comprising:
   a first position measuring coil which is attached to the outer surface of the lens barrel;

a second position measuring coil which is attached to the outer surface of the casing in a right-angle direction with respect to the lens barrel fixing pin driving coil;

a current input terminal which supplies a current to either the first position measuring coil or the second position measuring coil; and a position measuring voltage output terminal which is connected to one of the first and second position measuring coils which is not connected to the current input terminal.

3. The VCM of claim 1, wherein the lens barrel fixing pin is a ferromagnetic body or a paramagnetic body.

4. The VCM of claim 1, wherein the lens barrel fixing pin is partially a ferromagnetic body or a paramagnetic body.

5. The VCM of claim 2, wherein the coil connected to the current input terminal is also used as a coil for driving the lens barrel.

6. The VCM of claim 2, wherein the lens barrel fixing pin is a ferromagnetic body or a paramagnetic body.

7. The VCM of claim 2, wherein the lens barrel fixing pin is partially a ferromagnetic body or a paramagnetic body.

\* \* \* \* \*